Aug. 7, 1945.  E. L. HARDER  2,381,281
ELECTRICAL RELAY SYSTEM
Filed July 12, 1941  2 Sheets-Sheet 1
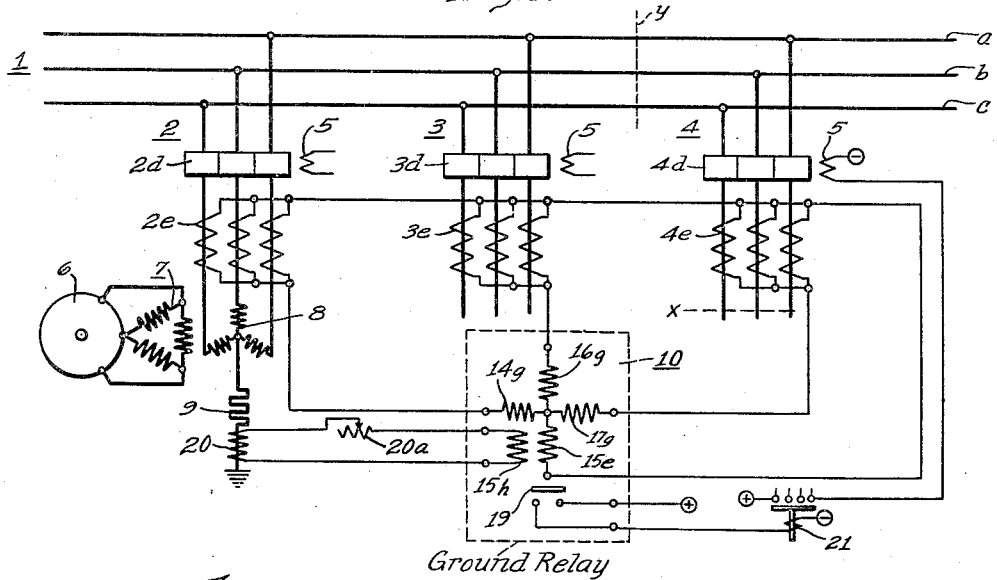
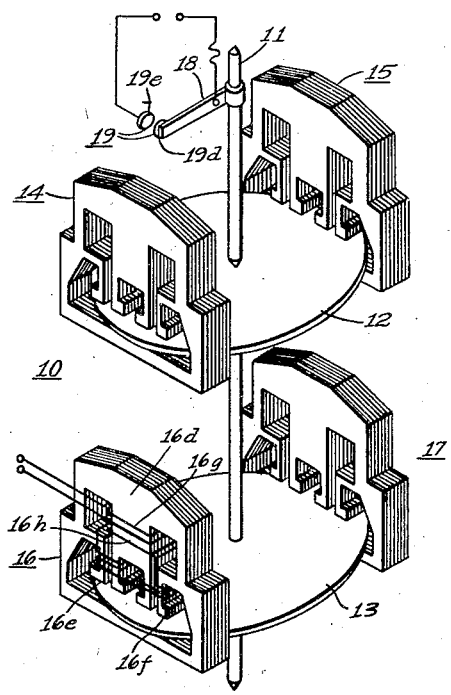
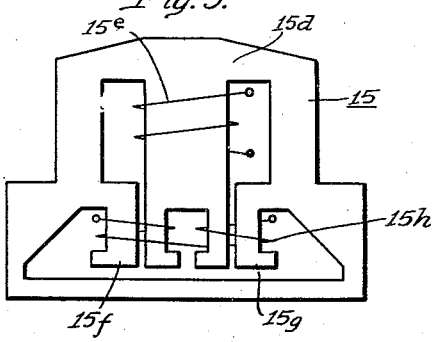
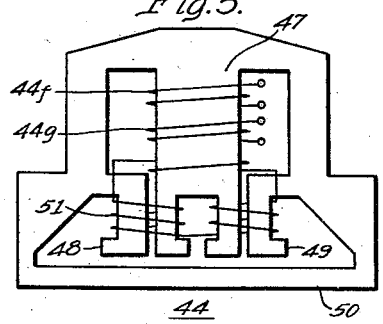
WITNESSES:
INVENTOR
Edwin L. Harder.
ATTORNEY Aug. 7, 1945.   E. L. HARDER   2,381,281
ELECTRICAL RELAY SYSTEM
Filed July 12, 1941   2 Sheets-Sheet 2

WITNESSES:
C. J. Weller.
C. L. Freedman

INVENTOR
Edwin L. Harder.
ATTORNEY

Patented Aug. 7, 1945

2,381,281

UNITED STATES PATENT OFFICE 2,381,281

ELECTRICAL RELAY SYSTEM

Edwin L. Harder, Forest Hills, Pa., assignor to Westinghouse Electric Corporation, East Pittsburgh, Pa., a corporation of Pennsylvania Application July 12, 1941, Serial No. 402,125

11 Claims. (Cl. 175—294)

This invention relates to protective electrical relay systems, and it has particular relation to systems employing relays of the percentage or ratio-differential type.

It often is desirable to protect electrical circuits against internal faults occurring within the system. If the system is provided with a plurality of terminals through which currents normally enter and leave the system, these currents may be balanced against each other. Under normal operating conditions the resultant of the currents entering the system through the terminals equals the resultant of those leaving the system through the terminals and no unbalance or difference current is obtained. Similarly, if a fault occurs external to the system, the resultant of the currents entering the system through the terminals equals the resultant of those leaving the system through the terminals and again no difference or unbalance current is obtained.

However, if a fault occurs within the system the resultant of the currents entering the system through the terminals no longer equals the resultant of the currents leaving the system through the terminals and a difference or unbalance current is obtained which corresponds to the current supplied to the internal fault. This difference or unbalance current may be employed for actuating a relay to remove the system from service or for otherwise protecting the system.

Generally it is inadvisable to energize the relay directly from the terminals. For this reason it is customary to provide each of the terminals with suitable coupling devices such as current transformers. Each of these current transformers under normal operating conditions is designed to provide a secondary current which bears a linear relation relative to the primary current flowing therethrough. If the current transformers maintain their ratios of transformation, their outputs may be combined in the same manner as the terminal currents with similar results.

Under fault conditions unusually heavy currents may flow through the primaries of the current transformers. These currents may be sufficient to saturate the transformers or cause the magnetic cores of the transformers to operate with decreasing permeability. When this condition obtains the outputs of the current transformers no longer bear a linear relation relative to their primary currents. If the transformer secondary currents are employed to indicate the balance between current supplied to and from the system, the deviation from linearity which may result from a heavy flow of current to an external fault may produce a resultant current sufficient to actuate the relay despite the fact that no internal fault is present.

To prevent improper actuation of a differential relay resulting from improper current transformer performance, it is customary to provide the differential relays with restraint windings effective when energized for opposing operation of the relay. Each of the restraint windings is energized in accordance with current passing through a separate one of the terminals. Since the energization of each restraint winding increases with an increase of current through the terminal, it follows that as the currents tending to saturate the current transformers increase, the restraint created by the currents also increase. Consequently false operations of the relay are materially reduced.

That portion of the current which enters and leaves the system through the terminals generally is designated as "through" current. In early differential relays having restraint windings, the relationship between current necessary to actuate the relay and the through current may be expressed as a percentage or ratio. For this reason such relays are termed "percentage" or "ratio differential relays." For example, a ten per cent percentage differential relay defines a relay which operates when at least ten per cent of the "through" or restraint current is passed through the operating winding of the relay. From this definition, it follows that the sensitivity of the relay varies inversely with the per cent designation thereof. Thus a five per cent relay is more sensitive than a ten per cent relay.

Despite the presence of restraint windings, the current unbalance resulting from such factors as saturation of the current transformers may suffice to overcome the restraint offered by the restraint windings and actuate the relay. In order to preclude operation under such circumstances, it has been the practice to adjust the early percentage differential relays for insensitive operation. For example, a percentage differential relay designed with a twenty-five per cent setting has been employed. Although such high settings reduce false relay operations, they are objectionable in many relay applications for the reason that the relay fails to respond to small internal faults. This may be understood more clearly by reference to a specific system.

In a typical 66,000-volt, three-phase system, let it be assumed that the system has its neutral grounded through a high impedance or resistance sufficient to limit the ground fault current on a solid ground fault to 450 amperes. Let it be assumed further than the system has a full-load current rating of 1400 amperes; that the maximum phase fault current is 10,000 amperes, and that the minimum phase fault current for which protection is desired is 1500 amperes. If such a system is provided with a percentage differential relay having a twenty-five per cent setting, it follows that the relay will not operate for internal ground faults. The relay may have a minimum trip setting of 200 to 300 amperes. With such a setting the relay requires at full load approximately twenty-five per cent of full load current plus a minimum operating current or about 500 amperes through its operating winding for actuating the relay. This value is above the maximum ground fault current permitted by the ground impedance. It may be noted in passing that the relay affords adequate protection against phase faults.

In the foregoing discussion the specific current values are given in primary terms, that is, these currents are those actually flowing in the terminals of the system to be protected. The currents actually applied to the relay are current transformer secondary currents which are considerably lower because of the transformation ratio of the terminal current transformers which may be of the order of 200.

In accordance with the invention, separate percentage differential relays are provided for ground and phase protection. This permits the adoption of a sensitive ground relay. In order to prevent improper operation of the ground relay due to saturation of the current transformers, the ground relay is operatively energized only when a ground fault is present on the system. This may be accomplished by providing means responsive to the residual or zero sequence voltage or current of the system for completing the energization of the relay. In a specific embodiment the ground relay may include an operating electromagnet provided with separate windings which, when energized, produce a shifting magnetic field operating to actuate the relay. One of the windings is energized in accordance with the difference or unbalance current derived from the current transformers associated with the system to be protected. The remaining winding is energized in accordance with the zero sequence or residual current or voltage of the system as from a current transformer associated with the grounded neutral of the system.

It is therefore an object of the invention to provide differential protection of improved sensitivity.

It is a further object of the invention to provide sensitive differential relay protection which is not subject to false operation.

It is a further object of the invention to provide a differential ground relay which is operatively energized only when a ground fault actually occurs on the system to be protected.

It is a still further object of the invention to provide a differential relay which is placed in operative condition only in response to a zero sequence quantity present in the system to be protected.

It is still another object of the invention to provide a differential relay having operating means more sensitive to an internal fault occurring in a system to be protected than to an external fault of equal magnitude.

Still another object of the invention is to provide a differential relay having polyphase operating means wherein the separate phases are energized from different sources.

Other objects of the invention will be apparent from the following description taken in conjunction with the accompanying drawings in which:

Figure 1 is a diagrammatic view of a differential relay system embodying the invention;

Fig. 2 is a view in perspective of a differential relay unit suitable for the system illustrated in Fig. 1;

Fig. 3 is a view in front plan of an electromagnet suitable for the relay unit of Fig. 2;

Fig. 5 is a view in front plan of an electromagnet suitable for the relay of Fig. 4.

Figure 4:
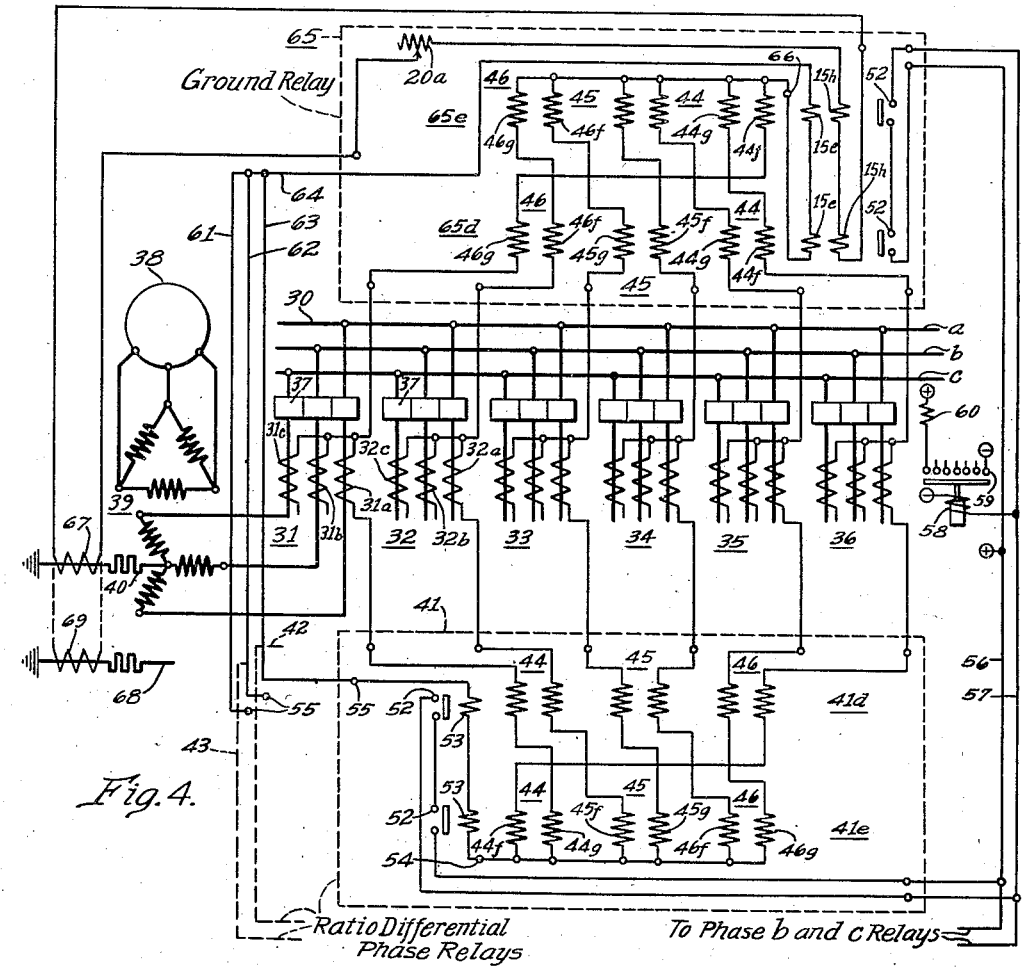
Fig. 4 is a diagrammatic view of a complete differential relay system embodying the invention.

Referring to the drawings, Fig. 1 shows a system I to be protected. This system may vary in form and may have different numbers of phases. In the specific embodiment illustrated in Fig. 1, the system is a three-phase system having three phase conductors $a$, $b$ and $c$. Current enters and leaves the system through terminals 2, 3 and 4. These terminals may vary in number and may have various functions. For example, the terminal 2 may be connected to a generator for supplying electrical energy to the system I. The terminal 3 may be connected to a tie circuit capable of supplying electrical energy to or from the system I, and the terminal 4 may be connected to a feeder circuit. The system I may represent any desired electrical apparatus. As illustrated, however, the system I represents a bus for connecting the various circuits associated with its terminals. The connection of the circuits may be controlled by means of suitable circuit breakers 2d, 3d and 4d having trip coils 5 associated therewith.

As a specific example, the terminal 2 may be energized from an alternating-current three-phase generator 6 which is connected to the primary winding of a power transformer. Such a power transformer may have a delta-connected primary winding 7 and a star-connected secondary winding 8 which, in turn, is connected to the terminal 2 for supplying electrical energy to the system I. It will be noted that the neutral of the secondary winding is connected to ground through an impedance 9 which limits ground fault current to a small value compared to phase-to-phase fault current. Although reactive impedances sometimes are employed for this purpose, the impedance 9 is illustrated as a resistor.

In order to protect the system I against internal ground faults, a ground relay 10 is associated therewith. This ground relay is not energized directly from the system I, but is energized through coupling devices such as current transformers associated therewith. To this end the terminal 2 is provided with a current transformer 2e for each phase conductor. The three secondary windings of the current transformers associated with the terminal 2 are connected in parallel. Consequently the resultant output of the current transformers normally will be proportional normally to the residual or zero phase sequence current flowing through the terminal 2. For convenience in illustration, it is assumed that the three current transformers 2e have a common transformation ratio. Similarly, the terminals 3 and 4 are provided with current transformers 3e and 4e.

A suitable relay construction for the ground relay 10 is illustrated in Fig. 2. The relay has an armature assembly which includes a shaft 11 mounted for rotation. The shaft 11 carries two electroconductive disks or armatures 12 and 13. Each of the armatures is mounted in the air gaps of two electromagnets 14 and 15 and 16 and 17, respectively. These electromagnets preferably have laminated soft iron cores as illustrated. Three of the electromagnets, such as electromagnets 14, 16 and 17, may be referred to as restraint electromagnets. Each of the restraint electromagnets is provided with a set of windings, one set being illustrated for the electromagnet 16.

Referring to the restraint electromagnet 16 more in detail, it will be noted that the electromagnet includes a main pole 16d having a lower split extremity and two auxiliary poles 16e and 16f. The main pole 16d is provided with a restraint winding 16g. In addition an auxiliary short-circuited winding 16h has turns wound, respectively, around the main pole 16d and around the auxiliary poles 16e and 16f, together with the split extremities of the main pole 16d. It will be understood that when alternating current is applied to the restraint winding 16g an induced alternating current flows in the auxiliary winding 16h. These windings cooperate to produce a shifting magnetic field tending to rotate the armature 13 which is positioned in the air gap beneath the poles. The restraint electromagnets 14 and 17 are provided with windings 14g and 17g similar to those described for the restraint electromagnet 16. These windings are illustrated diagrammatically in Fig. 1.

It will be noted that the shaft 11 carries an arm 18 for actuating a pair of contacts 19. These contacts include a movable contact 19d carried by the arm which is operable into and out of engagement with a stationary contact 19e. Normally, the arm 18 is biased by means of a spring (not shown) tending to maintain the contacts 19 separated.

The restraint electromagnets 14, 16 and 17 are effective when energized for urging the movable contact 19d away from the stationary contact 19e. On the other hand, the operating electromagnet 15, when energized, is effective for urging the movable contact 19d into engagement with the fixed contact 19e. The construction of the relay unit shown in Fig. 2 and thus far described is well known in the art.

In prior art differential relays the electromagnet 15 was provided with windings similar to those illustrated for the electromagnet 16. In accordance with this invention, the operating eletromagnet 15 may be in the form of a polyphase electroresponsive device provided with independent windings which may be energized independently from separate sources. Such windings are illustrated more particularly in Fig. 3.

Referring to Fig. 3, the operating electromagnet 15 is provided with a main pole 15d about which a main winding 15e is positioned. The electromagnet also is provided with auxiliary poles 15f and 15g about which an auxiliary winding 15h is wound. The auxiliary winding also surrounds split extensions from the main pole 15d. It will be noted that the windings 15e and 15h are provided with independent terminals whereby they may be independently energized. When currents differing in phase pass through the respective windings, a shifting magnetic field is set up in the air gap below the poles of the electromagnet. If the windings are energized from similar sources of voltage, the current passing through the winding 15e may be lagged substantially 90° behind the current passing through the windings 15h by providing the winding 15e with substantial inductance. The configuration of the electromagnet 15 contributes to a high inductance for the winding 15e.

Referring again to Fig. 1, it will be noted that the restraint windings 14g, 16g and 17g are connected, respectively, for energization from the secondary windings of the groups of current transformers 2e, 3e and 4e. Consequently the restraint produced by these windings will be proportional normally to the residual or zero sequence currents passing through the terminals 2, 3 and 4.

All of the restraint windings are connected to a common terminal of either of the operating windings, for example the main winding 15e. The other terminal of the main winding 15e is connected to the remaining terminals of the current transformers.

It will be observed that the relay connections thus far described comprise a parallel circuit having four branches. Each of three branches includes a group of current transformers and a restraint winding. The remaining branch includes the main winding 15e. Under normal operating conditions and for external ground faults substantially no current passes through the winding 15e. For an external ground fault, the ground fault current entering the system 1 through the terminals equals that leaving the system through the terminals. Consequently, the ground fault current flows in the restraint windings but produces no resultant for energizing the main winding 15e.

When an internal ground fault occurs on the system 1, the ground fault current entering the system through the terminals no longer equals that leaving the system through the terminals and a resultant current consequently flows through the winding 15e.

It will be noted that energization of one winding alone does not suffice to place the operating electromagnet 15 in operative condition. Energization of the remaining winding, in this case the auxiliary winding 15h, also is required. This winding is energized in accordance with current flowing through the grounded neutral of the system. Such current may be supplied through a coupling device such as a current transformer 20 associated with the ground for the neutral of the transformer secondary winding 8. Preferably a suitable phase shifter, here represented by an impedance 20a, is interposed between the current transformer 20 and the auxiliary winding 15h for controlling the phase of current passing through the auxiliary winding.

Actuation of the relay 10 may be employed for effecting any desired control operation. In Fig. 1, closure of the contacts 19 is employed for energizing a contactor 21. This contactor, in closing, sets up energizing tripping circuits for the trip coils 5 of the circuit breakers. One of these circuits is shown in detail in Fig. 1. If desired, alternating current may be employed for energizing the contactor and tripping circuits. For convenience, however, direct current is illustrated, the direct current source being shown by conventional plus and minus polarity markings.

It is believed that the operation of the system illustrated in Fig. 1 is apparent from the foregoing description. Under normal operating conditions substantially no residual or zero sequence current flows in any of the terminals. Consequently, the groups of current transformers 2e, 3e and 4e produce substantially no resultant outputs and the restraint windings 14g, 16g and 17g, together with the main winding 15e of the relay 10 are not energized. Similarly substantially no current flows through the grounded neutral of the transformer secondary 8 and the auxiliary relay 15h is not energized.

If a fault external to the system should occur as at a point $x$, or if an internal fault should occur as at a point $y$ between two or three phase-conductors, substantial current may flow in the system. If the current transformers 2e, 3e, 4e hold their ratio of transformation, they produce substantially no outputs for the reason that substantially no zero sequence or residual current flows. However, even though saturation should occur on one or more of the current transformers, operation of the relay 10 is impossible for the reason that the auxiliary winding 15h remains unenergized due to the absence of ground current through the current transformer 20.

Some external faults produce a direct current transient which may seriously saturate one or more of the current transformers. Assume that the fault at the point X on the terminal 4 is a three-phase fault which produces a direct current transient much larger in one phase than on the remaining two phases. Such a transient saturates one of the current transformers 4e without similarly saturating the remaining two transformers of this group. Under these conditions a residual current would be obtained from the current transformers 4e. Since the remaining terminals 2 and 3 may divide incoming current, the current transformers 2e and 3e may not saturate. This results in a large residual current in the winding 15e which is equal to that in the restraint winding 17g. However, since no current flows in the auxiliary winding 15h, the relay remains correctly inoperative. By way of contrast, the conventional relay would operate under these assumed conditions.

If a two-phase-to-ground fault occurs external to the system as at the point $x$, substantial current flows through the system because of the fault between phase conductors. Moreover, current flows through the current transformer 20 because the fault at the point $x$ involves a fault-to-ground. If the current transformers 2e, 3e and 4e hold their ratio of transformation under these conditions the restraint windings 14g, 16g and 17g carry currents which balance for the reason that the resultant current entering the system through the terminals equals that leaving the system through the terminals to the external fault. Consequently no difference current remains for the main winding 15e, and the relay 10 cannot operate. If saturation of the current transformers should result, it will be noted that two transformers of a group saturate substantially equally for the reason that they carry substantially equal current. Moreover, the phase current flows through these transformers in opposite directions so that the effects of their saturations balance each other. From this aspect current transformer saturation should not result in an operation of the relay 10 for a two-phase-to-ground fault.

It should be noted further that for the two-phase fault-to-ground the ground fault current is extremely small in comparison with the phase-to-phase current because of the presence of the grounding impedance 9. If the phase-to-phase fault current saturates two current transformers in one of the terminal groups, the difference in outputs between the transformers resulting from the flow of ground fault current therethrough must represent a minute fraction of the small ground fault current, and produces a relatively small current through the main winding 15e. The comparatively large restraint afforded by the through ground current consequently prevents improper operation of the relay.

If an internal ground fault occurs, as at the point $y$, the current entering the system through the terminals no longer equals that leaving the system through the terminals and current not only flows through the restraint windings but through the main winding 15e. In addition, the ground fault current passing through the transformer 20 energizes the auxiliary winding 15h. Since the relay 10 now is fully energized it operates to close the contacts 19. Closure of the contacts 19 results in tripping of the circuit breakers 2d, 3d, and 4d.

Referring to Fig. 4, an electrical system is disclosed which includes relays for protection against both phase faults and ground faults. In Fig. 4 a system 30 is disclosed which is to be protected against both phase and ground internal faults. This system may take various forms and may have different numbers of phases but for the purpose of illustration, the system 30 is a three-phase system having three phase conductors a, b, and c. This system may be provided with different numbers of terminals, but in the specific embodiment of Fig. 4, six terminals 31 to 36 are disclosed for supplying electrical energy to and from the system. Each of the terminals is connected to the system to be protected through a circuit breaker 37. The terminals may be employed for connecting various circuits to the system to be protected. For example, the terminals 31 and 32 may be employed for connecting generators to the system for supplying electrical energy thereto. The terminals 33, 34, and 35 may be employed for connecting tie circuits to the system 30 capable of supplying electrical energy to or from the system, and the remaining terminal 36 may be employed for connecting a feeder circuit to the system 30.

For the purpose of illustration the terminal 31 is employed for connecting the system 30 to a three-phase generator 38 through a power transformer 39. The power transformer includes a delta-connected primary winding associated with the generator 38 and a star-connected secondary winding having its neutral grounded through a high impedance 40. Although reactive impedances may be employed for grounding purposes, the impedance 40 is illustrated as a resistor.

In order to protect the system 30 against internal faults, a number of relays are provided which are energized from current transformers associated with the terminals. To this end the terminal 31 is provided with three current transformers 31a, 31b, and 31c. Similarly the terminal 32 is provided with current transformers 32a, 32b, and 32c, one current transformer being provided for each of the phase conductors. In like manner, each of the remaining terminals is provided with current transformers.

For protecting the system 30 against internal phase faults, three phase relays 41, 42, and 43 are provided. These relays are of the percentage or ratio differential type and for purpose of illustration, the relay 41 is shown in detail.

The relay 41 includes two similar relay units 41d and 41e. The relay unit 41d comprises a relay construction somewhat similar to that illustrated in Fig. 2. However, the windings provided for the restraint and operating electromagnets differ somewhat from the windings employed for the relay of Fig. 2.

As illustrated diagrammatically in Fig. 4, the relay unit 41d includes three restraint electromagnets 44, 45, and 46. Each of the restraint electromagnets is provided with two independent energizing windings, for example, the restraint electromagnet 44 includes two restraint windings 44f and 44g. As a further example, the restraint electromagnet 45 includes two restraint windings 45f and 45g. Each of the restraint electromagnets may be similar in construction to that illustrated in Fig. 5.

Referring to Fig. 5, the restraint electromagnet 44 is illustrated with its independent restraint windings 44f and 44g wound around a main pole 47 having a split extremity. In addition, the restraint electromagnet includes auxiliary poles 48 and 49 positioned above a magnetic keeper 50 for defining an air gap within which one of the disks 12 or 13 is mounted for rotation. A short-circuited auxiliary winding 51 is wound around the auxiliary poles 48 and 49, the split extremities of the main pole 47, and around the main pole 47. When either or both of the restraint windings 44f and 44g is or are energized, the net ampere turns are effective as though produced by one coil and a current is induced in the auxiliary winding 51. These windings cooperate to produce a shifting magnetic field in the air gap beneath the poles for urging an armature positioned therein in contact opening direction. The contacts 52 and armature assembly for the relay 41d may be similar to the contacts 19 and armature assembly illustrated in Fig. 2.

The operating electromagnet for the relay unit 41d is provided with a single operating winding 53. The operating electromagnet and the operating winding 53 may be similar to the electromagnet 16 and the windings associated therewith, as illustrated in Fig. 2. It should be observed, however, that the operating winding 53 when energized is effective for urging the contacts 52 into their contact closing condition.

As illustrated in Fig. 4, the relay 41 is associated with the phase "a" conductors of the various terminals. A pair of restraint windings including a restraint winding on each of two restraint electromagnets is connected for energization from one of the current transformers associated with the phase "a" conductor of one of the terminals. For example, the restraint winding 44f of the unit 41d and the restraint winding 44g of the unit 41e are connected in series to one secondary terminal of the current transformer 31a. As a further example, the secondary of the current transformer 32a has one terminal connected to the restraint winding 44g of the unit 41d and the restraint winding 45f of the unit 41e in series. In a similar manner, the connections of the remaining "a" phase current transformers may be traced to pairs of the remaining restraint windings. The principal reason for employing this paired connection of restraint windings is to reduce the variation in restraint obtained for different terminal connections of the system 30 and for different fault conditions which may occur on the system and its associated circuits.

The pairs of restraint windings, in turn, are connected in parallel to a common terminal member 54. It will be noted that the operating windings 53 of the relay units 41d and 41e are connected in series between the terminal member 54 and a terminal member 55. Consequently current flowing through the operating windings 53 normally will be proportional to the difference between current entering and leaving the system 30 through the phase "a" conductors of the terminals.

The contacts 52 of the relay units 41d and 41e are connected in series for effecting a control operation. Consequently closure of both of the contacts is required in order to complete a control circuit for tripping the circuit breaker 37 or for any other desired control operation. In the specific embodiment illustrated, the contacts 52 are connected in series across two control buses 56 and 57. Closure of both of the contacts completes a circuit across the buses 56 and 57 for energizing a contactor 58. The energization for the contactor 58 may be supplied from any desired source, but for purpose of illustration, a direct current source is shown by conventional plus and minus polarity markings.

When the contactor 58 is energized, it closes a plurality of front contacts 59 which may be employed for any desired control operation. As illustrated, the contacts 59 may be connected to trip coils 60 for the circuit breaker 37. For simplicity in illustration, only one of the trip coils 60 is shown connected to one of the contacts 59. Conventional polarity markings again are employed for representing an energizing source for the trip coils 60.

It is believed that the operation of the relay 41 is clear from the foregoing description. Under normal conditions of operation, current supplied to the system 30 through the terminals equals that leaving the system through the terminals. Since current flowing through the operating windings 53 is proportional to the difference between currents entering and leaving the system 30 through the phase "a" conductors of the terminals, it follows that normally no current flows through these operating windings. Consequently, the contacts 52 remain in their open conditions. If a fault occurs on a feeder or other circuit external to the system 30, the current entering the system through the terminals still equals that leaving the system through the terminals and the operating windings 53 remain unenergized.

However, if a fault occurs involving phase "a" within the system 30, a portion of the current supplied to the system leaves through the fault. Consequently, current entering the system 30 through the phase "a" conductors of the terminals no longer equals that leaving the system through the phase "a" conductors of the terminals, and a difference or unbalance current is obtained which flows through the operating winding 53 and results in closure of the contacts 52. Closure of the contacts 52, in turn, actuates the contactor 58 to trip the circuit breakers.

By providing a plurality of similar relay units 41d and 41e, protection can be provided for a multiterminal system with relay units of small, practical size. For a further understanding of the construction and operation of a relay suitable for the relay 41, reference may be made to copending Sonnemann applications, Serial No. 236,396, filed October 22, 1938, which is now Patent No. 2,246,548, and Serial No. 347,614, filed July 26, 1940, which are both assigned to the Westinghouse Electric & Manufacturing Company.

The relays 42 and 43 are similar to the relay 41 but are associated, respectively, with the phase "b" and phase "c" conductors of the terminals.

It will be noted that the operating windings 53 for each of the relays 41, 42, and 43 normally carry current proportional to the difference between resultant current entering and leaving the system 30 through separate phase conductors of the terminals. The operating windings of the three relays are connected in star through conductors 61, 62, and 63 to a neutral conductor 64. Consequently, current flowing through the neutral conductor 64 is normally proportional to the difference between resultant residual or zero sequence current entering and leaving the system 30 through the terminals.

As above indicated, the purpose of the relays 41, 42, and 43 is to protect the system 30 against internal phase faults. For protecting the system against internal ground faults, a percentage differential ground relay 65 is provided.

The ground relay 65 includes two relay units 65d and 65e and is similar to the phase relay 41 except for the operating windings. The phase relay 41 employs operating electromagnets each having a single energizing winding 53. By way of contrast, the ground relay units employ the operating electromagnets 15, each having a main energizing winding 15e and an auxiliary energizing winding 15h. The construction of the operating electromagnet 15 has been set forth previously with particular reference to Fig. 3.

By inspection of Fig. 4, it will be noted that the restraint windings of the ground relay 65 are segregated into pairs, each of the pairs being connected for energization in accordance with the residual or zero sequence current flowing through a separate terminal associated with the system 30. For example, the restraint winding 46g of the unit 65d and the restraint winding 44f of the unit 65e are connected to one terminal on each of the current transformers 31a, 31b and 31c. Consequently, the current flowing through these restraint windings 46g and 44f normally is proportional to the residual or zero sequence current flowing through the terminal 31. As a further example, the restraint winding 46f of the unit 65d and the restraint winding 46g of the unit 65e are connected for energization from the current transformers 32a, 32b and 32c in accordance with the residual or zero sequence current flowing through the terminal 32.

The pairs of restraint windings of the ground relay 65 all are connected in parallel to a common terminal contact 66. For this reason currents supplied to the terminal contact 66 normally are proportional to the difference between residual or zero sequence currents entering and leaving the system 30 through the terminals.

For energizing the operating electromagnets of the ground relay 65, the main windings 15e are connected between the terminal contact 66 and the neutral conductor 64, thus completing a circuit between the conductor and the terminal contact. Because of this connection of the main windings 15e, these windings normally are energized in accordance with the difference between residual or zero sequence current entering and leaving the system 30 through the terminals.

It will be observed that energization of the main windings 15e alone is not sufficient for actuating the ground relay 65. For operating the ground relay, it also is necessary to energize the auxiliary windings 15h. To this end the auxiliary windings are connected for energization in accordance with the ground current flowing through the resistor 40. Preferably, this is accomplished by energizing the auxiliary windings 15h from the secondary winding of a current transformer 67 associated with the ground conductor employed for grounding the neutral of the secondary winding of the power transformer 39. If the system 30 is grounded elsewhere as through a ground conductor 68, an additional current transformer 69 may be associated with the ground conductor 68 and connected in parallel with the current transformer 67 for energizing the auxiliary windings 15h in accordance with the total ground current present in the system 30. The phase shifter represented by the impedance 20a also may be employed for the same purpose discussed with reference to Fig. 1.

For control purposes the contacts 52 of the ground relay 65 are connected in series to establish when closed an energizing circuit for the contactor 58. For this purpose the contacts 52 may be connected in series across the control buses 56 and 57.

It is believed that the operation of the ground relay 65 is apparent from the description of the relay illustrated in Fig. 1. When an internal or external phase-to-phase fault occurs, no ground current flows through the resistor 40 and the auxiliary windings 15h remain unenergized. Consequently, operation of the ground relay is impossible.

If an external ground fault occurs on a feeder circuit associated with the system 30, ground current flows through the ground resistor 40 and the auxiliary windings 15h consequently are energized. Since the ground current entering the system 30 equals that leaving the system 30 to the external fault, it follows that no difference current is obtained for energizing the main windings 15e of the ground relay and the ground relay, therefore, fails to operate. Because the ground resistor 40 restricts the ground current to a small value, saturation of the current transformers associated with the terminals does not occur, and an energization of the main windings 15e because of dissimilar saturations of the current transformers does not result.

Under certain conditions a two-phase-to-ground fault may occur on one of the feeder circuits associated with the system 30. As above indicated with reference to Fig. 1, such an external fault may result in current flowing through both of the windings 15e and 15h. Since the percentage differential characteristics of the ground relay 65 provide adequate restraint under these conditions, operation of the ground relay does not result.

As previously explained a direct current transient produced by certain external faults, such as certain three phase feeder circuit faults, may saturate only one transformer of a terminal group of current transformers to produce a residual current output. This would energize the main windings 15e. However, since the auxiliary windings 15h remain unenergized, the ground relay correctly remains inoperative.

If a ground fault occurs within the system 30, ground current flows through the resistor 40 and it follows that the auxiliary windings 15h are energized. Moreover, the residual current entering the system 30 no longer equals that leaving the system through the terminals, the difference being represented by the current supplied to the internal ground fault. Consequently, a difference current is obtained for energizing the main windings 15e and the ground relay operates to energize the contactor 58.

By providing an independent ground relay 65 and independent phase relays 41, 42, and 43, the ground relay may be adjusted to a condition sufficiently sensitive for response to the small ground currents which are permitted to flow by the resistor 40. It will be observed that the pair of contacts 52 for each of the relays 41, 42, 43, and 65 is connected across the control buses 56 and 57. Consequently, operation of any of the relays results in energization of the contactor 58.

In the foregoing discussion it has been assumed that the various percentage differential relays have a straight-line characteristic. In other words, a current flowing through the energizing windings of the operating electromagnet of a relay necessary to effect an operation of the relay is a constant percentage of the total current flowing through the restraint windings of the relay throughout the operating range of the relay.

The percentage differential relays herein disclosed also may have "flared" characteristics in accordance with the teachings of the W. K. Sonnemann et al. Patent No. 2,240,677. In order to provide a percentage differential relay having a flared characteristic, the operating electromagnet may have its magnetic core designed to saturate or operate with decreasing permeability when the energizing current therefor increases above a predetermined value within the operating range of the relay. For a more detailed description of the flared characteristic relay, reference may be made to the aforesaid Sonnemann et al. patent.

Figure 6:
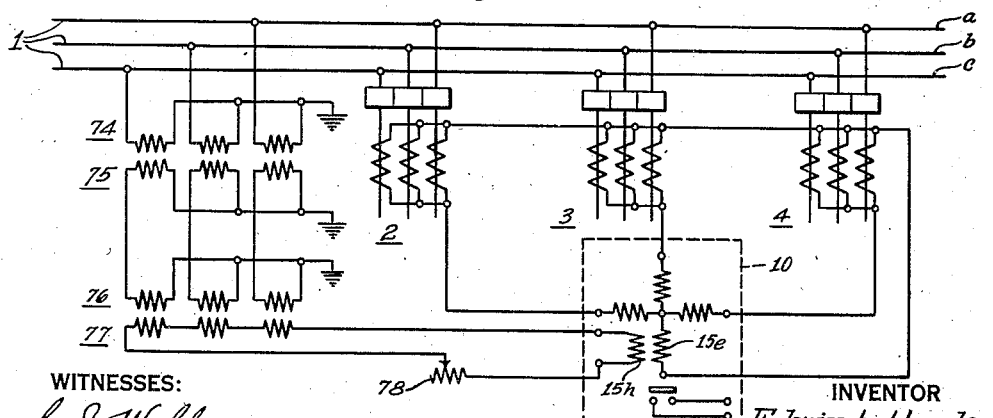
Fig. 6 is a diagrammatic view showing a modified form of the invention.

Referring to Fig. 6, a further modification is illustrated which is particularly suitable for certain systems. For example, a system to be protected may have a ground impedance which is not in service at all times. On such a system it may be desirable to replace the current transformer 20 by a system for energizing the auxiliary winding of the operating electromagnet in accordance with the residual or zero sequence voltage present on the system to be protected.

In Fig. 6 the system to be protected, the terminal arrangement, and the ground relay 10 are similar to the corresponding elements of Fig. 1. However, for energizing the auxiliary winding 15h of the relay 10 in accordance with the residual or zero sequence voltage present on the system 1, suitable means having an output controlled by such voltage, such as a plurality of auxiliary transformers, are provided. These transformers include a first bank having primary windings 74 connected in star for energization from the system 1 and secondary windings 75 also connected in star. Both the primary and secondary windings have their neutrals grounded. The secondary windings 75 are employed for energizing the star connected primary windings 76 of a second transformer bank. These primary windings 76 also have their neutral grounded. The secondary windings 77 of the second transformer bank are connected in delta for energizing the auxiliary winding 15h. As will be understood in the art, the connections of the various transformers are such that the auxiliary winding 15h is energized by a current proportional to the residual or zero phase sequence voltage present on the system 1.

In order to establish a proper phase relationship between currents passing through the auxiliary and main windings 15h and 15e, it may be desirable to provide a phase shifter represented in Fig. 6 by an impedance 78. By proper selection of the phase shifter the phase displacement between currents passing through the main and auxiliary windings may be adjusted, if desired.

The operation of the ground relay illustrated in Fig. 6 is similar to the operation of the relay shown in Fig. 1.

By proper adjustment of the phase displacement between currents passing through the main and auxiliary windings 15e and 15h, it is possible to obtain certain desirable operating characteristics. The torque developed by the operating electromagnet is dependent upon the phase displacement between currents passing through the main and auxiliary windings thereof. By proper adjustment of the phase shifter 78 (or of the phase shifter 20a of Figs. 1 and 4) this phase displacement may be selected to provide maximum torque from the operating element under internal fault conditions. For an external fault the impedance pattern of the electrical system results generally in a different phase displacement between currents passing through the main and auxiliary windings 15e and 15h. Consequently, for the external fault the operating electromagnet will develop less than its maximum operating torque for a given magnitude of current flow through the main winding 15e. Such a reduction in torque assists the relay in discriminating between internal and external faults.

It should be observed that the ground relay of this invention may be employed alone for ground fault protection or may be employed in combination with any desired relay system designed to provide protection against phase-to-phase faults, as illustrated, for example, in Fig. 4.

Although the invention has been described with reference to certain specific embodiments thereof, numerous modifications are possible. Therefore, the invention is to be restricted only by the appended claims as interpreted in view of the prior art.

I claim as my invention:

1. In a protective arrangement for an alternating current system having a plurality of terminals through which currents normally enter and leave the system, means for deriving from each of said terminals a quantity normally dependent on residual current flowing therein, differential relay means including restraint means and operating means, means for energizing said restraint means in accordance with said quantities, said operating means comprising first means and second means coacting for effecting an operation of said operating means, means for energizing said first means in accordance with the resultant of said quantities, and means independent of said first-named means for energizing said second means in accordance with a residual quantity present in said system.

2. In a protective arrangement for a grounded-neutral polyphase system having a plurality of terminals through which currents normally enter and leave the system, current transformers associated with said terminals, said current transformers being designed to produce an output for each of said terminals normally dependent on the zero sequence current in the respective terminals, differential relay means including control means, operating means effective when energized for operating said control means and restraint means effective when energized for opposing operation of said control means, means for energizing said restraint means in accordance with the outputs of said current transformers, means for energizing said operating means in accordance with the resultant of the outputs of said current transformers, and means for additionally energizing said operating means in accordance with current passing through the grounded neutral of said system.

3. In a protective arrangement for a grounded-neutral polyphase system having a plurality of terminals through which currents normally enter and leave the system, current transformers associated with said terminals, said current transformers being designed to produce an output for each of said terminals normally dependent on the zero sequence current in the respective terminals, differential relay means including control means, operating means effective when energized for operating said control means and restraint means including a plurality of restraint windings effective when energized for opposing operation of said control means, means for energizing said restraint windings respectively in accordance with the outputs of said current transformers, said operating means including first means and second means coacting to condition said operating means for operation, means for energizing said first means from the outputs of said current transformers normally in accordance with the difference between zero sequence current entering and leaving said system through said terminals, and means independent of said current transformers for energizing said second means in accordance with a zero sequence quantity in said system.

4. In a protective arrangement for an alternating current system having a plurality of terminals through which currents normally enter and leave the system, means for deriving from each of said terminals a quantity normally dependent on residual current flowing therein, said means producing a resultant normally dependent on the difference between residual current entering and leaving said system through said terminals, and said means also operating to produce said resultant under certain conditions wherein said difference is not actually present, differential relay means including restraint means and operating means, means for energizing said restraint means in accordance with said quantities, said operating means comprising polyphase actuating means, means for energizing a first phase of said actuating means in accordance with the resultant difference of said quantities dependent respectively on residual currents entering and leaving said system, and means independent of said first-named means for energizing a second phase of said actuating means in accordance with a residual quantity present in said system.

5. In a protective arrangement for a grounded-neutral polyphase system having a plurality of terminals through which currents normally enter and leave the system, current transformers associated with said terminals, said current transformers being designed to produce an output for each of said terminals normally dependent on the zero sequence current in the respective terminals, said current transformers producing a resultant normally dependent on the difference between zero sequence current entering and leaving said system through said terminals, and said current transformers also operating to produce said resultant under certain conditions wherein said difference is not actually present, differential relay means including control means, operating means effective when energized for operating said control means and restraint means including a plurality of restraint windings effective when energized for opposing operation of said control means, means for energizing said restraint windings respectively in accordance with the outputs of said current transformers, said operating means comprising polyphase motive means, means for energizing a first phase of said motive means in accordance with the resultant of the outputs of said current transformers, and means independent of said current transformers for energizing a second phase of said motive means in accordance with current passing through the grounded neutral of said system.

6. In a differential relay, a control unit having an electroconductive armature member, operating means for operating said control unit, and a plurality of restraint means for opposing operation of said control unit, said operating means including an electromagnet structure associated with said armature member, and a plurality of energizing windings for said electromagnet structure each arranged for independent energization, said windings being effective only when all of said windings are energized for producing a shifting magnetic field acting on said armature member to operate said control unit.

7. In a protective arrangement for a polyphase system having a plurality of terminals through which currents normally enter and leave the system, current transformer means for each of said terminals, each of said means being designed for producing an output dependent normally on residual current flowing in its associated terminals, said means producing a resultant normally dependent on the difference between residual current entering and leaving said system through said terminals, and said means also operating to produce said resultant under certain conditions wherein said difference is not actually present, normally ineffective translating means responsive when effective to the resultant of the outputs of said current transformer means, and means responsive to zero sequence voltage in said system for rendering said translating means effective.

8. In a protective arrangement for a polyphase system having a plurality of terminals through which currents normally enter and leave the system, current transformers associated with said terminals, said current transformers being designed to produce an output for each of said terminals normally dependent on the zero sequence current in the respective terminals, said current transformers producing a resultant normally dependent on the difference between zero sequence current entering and leaving said system through said terminals, and said current transformers also operating to produce said resultant under certain conditions wherein said difference is not actually present, differential relay means including control means, operating means effective when energized for operating said control means, and restraint means including a plurality of restraint windings effective when energized for opposing operation of said control means, means for energizing said restraint windings respectively in accordance with the outputs of said current transformers, said operating means including first means and second means coacting to condition said operating means for operation, means for energizing said first means in accordance with the resultant of the outputs of said current transformers, voltage transformer means associated with said system for producing an output dependent on the zero sequence voltage of said system, and means controlled by said output for energizing said second means.

9. In a protective arrangement for a grounded-neutral polyphase system having a plurality of terminals through which currents normally enter and leave the system, current transformers associated with said terminals, said current transformers being designed to produce an output for each of said terminals normally dependent on the zero sequence current in the respective terminals, said current transformers producing a resultant normally dependent on the difference between zero sequence current entering and leaving said system through said terminals, and said current transformers also operating to produce said resultant under certain conditions wherein said difference is not actually present, ground relay means including control means, operating means effective when energized for operating said control means and restraint means including a plurality of restraint windings effective when energized for opposing operation of said control means, means for energizing said restraint windings respectively in accordance with the outputs of said current transformers, said operating means including first means and second means coacting to condition said operating means for operation, means for energizing said first means in accordance with the resultant of the outputs of said current transformers, means independent of said current transformers for energizing said second means in accordance with a zero sequence quantity in said system, and phase differential relay means for said system, said phase differential relay means being connected for energization from said current transformers employed for energizing said ground differential relay means.

10. In a protective arrangement for an alternating current system having a plurality of terminals through which currents normally enter and leave the system, a differential relay having operating means comprising first means and second means coacting to condition said operating means for operation, and means associating said operating means with said system for energizing said first and second means from two phase-displaced quantities derived from said system to provide a greater response from said operating means in response to an internal fault on said system than to energization from a fault external to said system, said associating means including means for rendering the coaction of said first and second means more efficient in response to the phase-displaced quantities present for an internal fault than for the corresponding quantities present during an external fault.

11. In a protective arrangement for a grounded-neutral polyphase system having a plurality of terminals through which currents normally enter and leave the system, current transformers associated with said terminals, said current transformers being designed to produce an output for each of said terminals normally dependent on the zero sequence current in the respective terminals, said current transformers producing a resultant normally dependent on the difference between zero sequence current entering and leaving said system through said terminals, and said current transformers also operating to produce said resultant under certain conditions wherein said difference is not actually present, differential relay means including control means, operating means effective when energized for operating said control means and restraint means including a plurality of restraint windings effective when energized for opposing operation of said control means, means for energizing said restraint windings respectively in accordance with the outputs of said current transformers, said operating means including first means and second means coacting to condition said operating means for operation, means for energizing said first means in accordance with the resultant of the outputs of said current transformers, means independent of said current transformers for energizing said second means in accordance with a zero sequence quantity in said system, and phase shifting means for varying the phase of energization of said first means relative to the energization of said second means, said phase shifting means being designed to provide optimum performance of said operating means in response to energizations thereof caused by faults occurring within said system.

EDWIN L. HARDER.